United States Patent
Weng et al.

(10) Patent No.: US 7,324,927 B2
(45) Date of Patent: Jan. 29, 2008

(54) FAST FEATURE SELECTION METHOD AND SYSTEM FOR MAXIMUM ENTROPY MODELING

(75) Inventors: Fuliang Weng, Mountain View, CA (US); Yaqian Zhou, Shanghai (CN)

(73) Assignees: Robert Bosch GmbH, Stuttgart (DE); The Board Of Trustees Of The Leland Stanford Junior University CA (US)

(*) Notice: Subject to any disclaimer, the term of this patent is extended or adjusted under 35 U.S.C. 154(b) by 656 days.

(21) Appl. No.: 10/613,366

(22) Filed: Jul. 3, 2003

(65) Prior Publication Data
US 2005/0021317 A1    Jan. 27, 2005

(51) Int. Cl.
G06F 17/10 (2006.01)
(52) U.S. Cl. .............. 703/2; 704/2; 704/10; 704/240; 704/224; 706/45; 706/21; 702/181
(58) Field of Classification Search .............. 703/2; 704/2, 10, 1, 224, 240, 9, 276, 257; 706/21, 706/45; 702/181
See application file for complete search history.

(56) References Cited

U.S. PATENT DOCUMENTS

| | | | |
|---|---|---|---|
| 5,991,710 A * | 11/1999 | Papineni et al. ............ | 704/2 |
| 6,049,767 A * | 4/2000 | Printz .......................... | 704/240 |
| 6,304,841 B1 * | 10/2001 | Berger et al. ................ | 704/2 |
| 6,523,019 B1 * | 2/2003 | Borthwick ................... | 706/45 |
| 6,697,769 B1 * | 2/2004 | Goodman et al. ........... | 703/2 |
| 2002/0111780 A1 * | 8/2002 | Sy ............................... | 703/2 |
| 2002/0111793 A1 * | 8/2002 | Luo et al. .................... | 704/10 |
| 2002/0188421 A1 * | 12/2002 | Tanigaki et al. ............. | 702/181 |
| 2003/0055655 A1 * | 3/2003 | Suominen .................... | 704/276 |
| 2003/0074183 A1 * | 4/2003 | Eisele ......................... | 704/1 |
| 2003/0126102 A1 * | 7/2003 | Borthwick ................... | 706/21 |
| 2003/0236662 A1 * | 12/2003 | Goodman ..................... | 704/224 |
| 2004/0193401 A1 * | 9/2004 | Ringger et al. .............. | 704/9 |

OTHER PUBLICATIONS

Gandrabur et al., "Confidence estimation for translation prediction", ACM May 2003.*
Greiff et al., "The maximum entropy approach and probabilistic IR models", ACM 2000.*
Adam L. Berger, Stephen A. Della Pietra, and Vincent J. Della Pietra, A Maximum Entropy Approach to Natural Language Processing, Computational Linguistic, 22 (1): 39-71 (1996).
Stanley Chen and Ronald Rosenfeld, Efficient Sampling and Feature Selection in Whole Sentence Maximum Entropy Language Models, Proceedings of ICASSP-1999, Phoenix, Arizona (1999).
Joshua Goodman, Sequential Conditional Generalized Iterative Scaling, Association for Computational Linguistics, Philadelphia, Pennsylvania (2002).

(Continued)

Primary Examiner—Kandasamy Thangavelu
(74) Attorney, Agent, or Firm—Kenyon & Kenyon LLP

(57) ABSTRACT

A method to select features for maximum entropy modeling in which the gains for all candidate features are determined during an initialization stage and gains for only top-ranked features are determined during each feature selection stage. The candidate features are ranked in an ordered list based on the determined gains, a top-ranked feature in the ordered list with a highest gain is selected, and the model is adjusted using the selected top-ranked feature.

17 Claims, 12 Drawing Sheets

OTHER PUBLICATIONS

Rob Koeling, Chunking with Maximum Entropy Models, Proceedings of CoNLL-2000 and LLL-2000, Lisbon, Portugal, 139-141 (2000).

Adwait Ratnaparkhi, Maximum Entropy Models for Natural Language Ambiguity Resolution, Ph.D thesis, University of Pennsylvania (1998).

Adam Berger and Harry Printz, A Comparison of Criteria for Maximum Entropy/Minimum Divergence Feature Selection, Proceedings of the 3$^{rd}$ conference on Empirical Methods in Natural Language Processing, Granda, Spain (1998).

Ronald Rosenfeld, Adaptive Statistical Language Modeling: A Maximum Entropy Approach, Ph.D thesis, Carnegie Mellon University (1994).

J. Reynar and A. Ratnaparkhi, A Maximum Entropy Approach to Identifying Sentence Boundaries, Proceedings of the Fifth Conference on Applied Natural Language Processing, Washington, D.C., 16-19 (1997).

Zhou Ya-Qian, Guo Yi-Kun, Huang Xuan-jing, and Wu Li-de, Chinese and English BaseNP Recognized by Maximum Entropy, Journal of Computer Research and Development, Beijing (2003).

Andrew J. Hunt and Alan W. Black, Unit Selection In a Concatenative Speech Synthesis System Using A Large Speech Database, Proc. ICASSP-96, May 7-10, Atlanta, GA.

Fuliang Weng, Andreas Stolcke, and Michael Cohen, Language Modelling for Multilingual Speech Translation in Manny Rayner, David Carter, Pierrette Bouillon, Vassilis Digalakis, Mats Wiren (ed.), The Spoken Language Translator, ch. 16, Cambridge University Press (2000).

Ronald Rosenfield, Larry Wasserman, Can Cai, and Xiaojin Zhu, Interactive Feature Induction and Logistic Regression for Whole Sentence Exponential Language Models, Proceedings of IEEE workshop on automatic speech recognition and understanding, Keystone, Colorado (Dec. 1999).

* cited by examiner

0. Initialize: $S = \emptyset$, $sum[1..I, 1..Y] = 1$, $z[1..I] = Y$
1. Gain computation:
   MaxGain = 0
   for $f$ in feature space $F$ do
   $$\hat{\alpha} = \arg\max_{\alpha} G_{S \cup f}(\alpha)$$
   $$\hat{g} = \max_{\alpha} G_{S \cup f}(\alpha)$$
   if MaxGain $< \hat{g}$ then
   MaxGain = $\hat{g}$
   $f^* = f$
   $\alpha^* = \hat{\alpha}$
2. Feature selection:
   $S = S \cup \{f^*\}$
   $F = F - \{f^*\}$
3. if termination condition is met, then stop
4. Model adjustment:
   for instance $i$ such that there is $y$
   and $f^*(x_i, y) = 1$ do
   $z[i]\ -\!= sum[i, y]$
   $sum[i, y]\ \times\!= \exp(\alpha^*)$
   $z[i]\ +\!= sum[i, y]$
5. go to step 1.

Figure 2

0. Initialize: $S = \emptyset$, $sum[1..I, 1..Y] = 1$,
   $z[1..I] = Y$, $g[1..F] = \{g(1,0),...,g(F,0)\}$
1. Gain computation:
   MaxGain = 0
   Loop
   $f_j = \arg\max_{f \text{ in } F}\{g[1,...,|F|]\}$ if $g[j] \leq$ MaxGain then go to step 2
   else
   $\hat{\alpha} = \arg\max_{\alpha} G_{S \cup f}(\alpha)$
   $\hat{g} = \max_{\alpha} G_{S \cup f}(\alpha)$
   $g[j] = \hat{g}$
   if MaxGain $< \hat{g}$ then
      MaxGain $= \hat{g}$
      $f^* = f_j$
      $\alpha^* = \hat{\alpha}$ 2. Feature selection:
   $S = S \cup \{f^*\}$
   $F = F - \{f^*\}$
3. if termination condition is met, then stop
4. Model adjustment:
   for instance $i$ such that there is $y$
                    and $f^*(x_i, y) = 1$ do
      $z[i] \mathrel{-}= sum[i, y]$
      $sum[i, y] \mathrel{\times}= \exp(\alpha^*)$
      $z[i] \mathrel{+}= sum[i, y]$
5. go to step 1.

Figure 3

Initialization

FAST FEATURE SELECTION METHOD AND SYSTEM FOR MAXIMUM ENTROPY MODELING

FIELD OF THE INVENTION

The present invention relates to a method and system to efficiently select high quality features for conditional maximum entropy modeling.

BACKGROUND INFORMATION

Maximum Entropy (ME) modeling is a general statistical modeling paradigm that may be applied in language modeling and natural language processing to predict linguistic behavior by incorporating various informative features, each encoding some linguistically statistical event, from a corpus of data into a common framework of conditional models. Such modeling, however, may be computationally intensive.

ME modeling may be separated into two main tasks: a feature selection process that chooses from a feature event space a subset of desired features to be included in the model; and a parameter estimation process that estimates the weighting factors for each selected feature. In many applications, however, it may not be clear which features are important for a particular task so that a large feature event space may be required to ensure that important features are not missed. Yet, including all or nearly all features may cause data overfitting, may slow the predictive process, and may make the resulting model too large for resource-constrained applications.

It is believed that more of the effort in ME modeling may have been focused on parameter estimation, and that less effort has been made in feature selection since it may not be required for certain tasks when parameter estimating algorithms are sufficiently fast. However, when the feature event space is necessarily large and complex, it may be desirable to perform at least some form of feature selection to speed up the probability computation, to reduce memory requirements during runtime, and to shorten the cycle of model selection during the training. Unfortunately, when the feature event space under investigation is large, feature selection itself may be difficult and slow since the universe of all the possible feature subsets to choose from may be exceedingly large. In particular, the universe of all possible feature subsets may have a size of $2^{|\Omega|}$, where $|\Omega|$ is the size of the feature event space.

Various techniques may be applied to facilitate and/or minimize the task of feature selection. As discussed in Ronald Rosenfeld, "Adaptive Statistical Language Modeling: A Maximum Entropy Approach", Ph.D. thesis, Carnegie Mellon University, April 1994 ("Rosenfeld (1994)"); Adwait Ratnaparkhi, "Maximum Entropy Models for Natural Language Ambiguity Resolution", Ph.D. thesis, University of Pennsylvania, 1998 ("Ratnaparkhi (1998)"); J. Reynar and A. Ratnaparkhi, "A Maximum Entropy Approach to Identifying Sentence Boundaries", Proceedings of the Fifth Conference on Applied Natural Language Processing 1997, Washington D.C., 16-19 ("Reynar and Ratnaparkhi (1997)"); Rob Koeling, "Chunking with Maximum Entropy Models", Proceedings of CoNLL-2000 and LLL-2000, Lisbon, Portugal, 139-141 ("Koeling (2000)"), a simple count cutoff technique may be used, in which only the features that occur in a corpus more than a pre-defined cutoff threshold are selected. As discussed in Ratnaparkhi (1998), the count cutoff technique may be fast and may be easy to implement, but may contain a large number of redundant features. A more refined algorithm, the so-called incremental feature selection (IFS) algorithm referred to in Adam L. Berger, Stephen A. Della Pietra, and Vincent J. Della Pietra, "A Maximum Entropy Approach to Natural Language Processing", Computational Linguistic, 22 (1): 39-71, 2000 ("Berger et al. (1996)"), requires that only one feature be added at each selection stage and that estimated parameter values be retained for the features selected in the previous stages. In this regard, for each selection stage, the IFS algorithm may be used to compute the feature gains for all the candidate features (a measure of the informative content of the features), select the feature with the maximum gain, and then adjust the model with the selected feature.

As compared to the simple count cutoff technique, the IFS algorithm may remove the redundancy in the selected feature set, but the speed of the algorithm may be an issue for complex tasks. Having realized the drawback of the IFS algorithm, Adam L. Berger and Harry Printz "A Comparison of Criteria for Maximum Entropy/Minimum Divergence Feature Selection", Proceedings of the $3^{rd}$ conference on Empirical Methods in Natural Language Processing, Granda, Spain 1998 ("Berger and Printz (1998)") proposed an $\phi$-orthogonal condition for selecting k features at the same time without affecting much the quality of the selected features. While this technique may be applicable for certain feature sets, such as link features between words, the $\phi$-orthogonal condition may not hold if part-of-speech (POS) tags are dominantly present in a feature subset.

Stanley Chen and Ronald Rosenfeld, in "Efficient Sampling and Feature Selection in Whole Sentence maximum Entropy Language Models", Proceedings of ICASSP-1999, Phoenix, Ariz. ("Chen and Rosenfeld (1999)"), experimented on a feature selection technique that uses a $\chi^2$ test to see whether a feature should be included in the ME model, where the $\chi^2$ test is computed using the counts from a prior distribution and the counts from the real training data. It may be sufficient for some language modeling tasks. However, a relationship between % test score and the likelihood gain, which may be required to optimize the ME model, may be absent.

In sum, the existing feature selection algorithms may be slow, may select features with less than optimal quality, may involve a non-trivial amount of manual work, or may have a low reduction rate. Consequently, those who use existing feature selection algorithms may use a much smaller or constrained feature event space, which may miss important undiscovered features, or they may build a larger model, which may impose an extra demand on system memory requirements.

SUMMARY OF THE INVENTION

The present invention is intended to provide a fast method for selecting high quality features for Maximum Entropy (ME) modeling that may be applied in areas of statistical modeling and linear regression, ranging from language understanding and bio-informatics to stock market prediction. In this regard, the fast feature selection method of the present invention may build compact, high-quality, robust models and make feasible many previously impractical tasks.

According to an exemplary feature selection method of the present invention, instead of computing the approximate features gains for all candidate features at each selection stage, which maybe time consuming for applications requiring a large feature event space, the exemplary feature selection method only computes the approximate gains for the feature(s) ranked during the current feature selection stage as having the largest gain (i.e. "the top-ranked features") based on models obtained from previous feature selection stages. That is, the exemplary feature selection method only computes the approximate gains for those candidate features positioned to be within a top portion of an ordered list of the candidate features, the size of the top portion being determined dynamically, for example, at each feature selection stage. In this regard, the exemplary feature selection method may be referred to as the selective gain computation (SGC) method and may provide faster feature selection without sacrificing the quality of features selected. For example, an exemplary SGC feature selection method may run hundreds to thousands times faster than existing incremental feature selection (IFS) algorithms.

According to one exemplary embodiment, the SGC feature selection method may include a "look-ahead" functionality.

According to another exemplary embodiment, the SGC feature selection method may include a re-evaluation of the feature gains of all features at a pre-specified interval.

Experiments using financial newspaper test from the Wall Street Journal obtained from the Penn Treebank prepared by Linguistic Data Consortium were conducted to show that an exemplary selective gain computation (SGC) feature selection method may significantly speed up the feature selection process while maintaining the same quality of selected features.

Accordingly to another exemplary embodiment, the fast selection method may select features for conditional maximum entropy modeling. In this regard, instead of determining the approximate gains for all candidate features at each selection stage, the exemplary fast selection method only determines the approximate gains for the top-ranked features based on the models obtained from previous stages. The exemplary fast selection method may also include a look-ahead functionality to further confirm the quality of the selected features. Given a feature space of size F, the exemplary fast selection method only uses O(F) more space than an approach which determines approximate gains for all candidate features at each selection stage.

An exemplary method of the present invention is directed to selecting features for maximum entropy modeling, in which gains for candidate features are determined during an initialization stage and gains for only top-ranked features are determined during each feature selection stage, the candidate features are ranked in an ordered list based on the determined gains, a top-ranked feature in the ordered list with a highest gain is selected, and a model is adjusted using the selected top-ranked feature.

Another exemplary method of the present invention is directed to selecting features for maximum entropy modeling, in which the gains of the candidate features determined in a previous feature selection stage are reused as upper bound gains of remaining candidate features in a current feature selection stage.

Yet another exemplary method of the present invention is directed to selecting features for maximum entropy modeling, in which the top-ranked feature is selected if its determined gain is greater than the upper bound gains of the remaining candidate features.

Still another exemplary method of the present invention is directed to selecting features for maximum entropy modeling, in which the top-ranked feature is selected when a gain of the top-ranked feature determined using a currently adjusted model is greater than the gains of remaining candidate features determined using a previously adjusted model.

Yet another exemplary method of the present invention is directed to selecting features for maximum entropy modeling, in which gains for a predefined number of top-ranked features are determined at each feature selection stage.

Still another exemplary method of the present invention is directed to selecting features for maximum entropy modeling, in which gains of all remaining candidate features are re-evaluated at a pre-defined feature selection stage.

Yet another exemplary method of the present invention is directed to selecting features for maximum entropy modeling, in which only the un-normalized conditional probabilities that satisfy a set of selected features are modified.

Still another exemplary method of the present invention is directed to selecting features for maximum entropy modeling, in which gains of candidate features are computed using a uniform distribution, the candidate features are ordered in an ordered list based on the computed gains, a top-ranked feature is selected with a highest gain in the ordered list, a model is adjusted using the selected top-ranked feature, the top-ranked feature is removed from the ordered list so that a next-ranked feature in the ordered list becomes the top-ranked feature, a gain of the top-ranked feature is computed using the adjusted model, and the gain of the top-ranked feature is compared with a gain of the next-ranked feature in the ordered list. If the gain of the top-ranked feature is less than the gain of the next-ranked feature, the top-ranked feature is repositioned in the ordered list so that the next-ranked feature becomes the top-ranked feature and an order of the ordered list is maintained and the steps of computing the gain of the top-ranked feature, comparing the gain of the top-ranked feature with the gain of the next-ranked feature are repeated. The entire non-initialization steps are repeated until the number of selected features exceeds a predefined value or a gain of a last-selected feature falls below a predefined value.

Yet another exemplary method of the present invention is directed to selecting features for maximum entropy modeling, in which the step of computing the gain of the top-ranked feature includes computing the gain of a predefined number of top-ranked features.

Still another exemplary method of the present invention is directed to selecting features for maximum entropy modeling, in which the gains of all remaining features at a predefined feature selection are re-evaluated.

Yet another exemplary method of the present invention is directed to selecting features for maximum entropy modeling, in which gains of a majority of the candidate features remaining at each feature selection stage are reused based on the model adjusted in a previous feature selection stage.

Still another exemplary embodiment of the present invention is directed to a processing arrangement system to perform maximum entropy modeling in which one or more candidate features derived from a corpus of data are incorporated into a model that predicts linguistic behavior, the system including a gain computation arrangement to determine gains for the candidate features during an initialization stage and to compute gains for only top-ranked features during a feature selection stage, a feature ranking arrangement to rank features based on the determined gain, a feature selection arrangement to select a feature with a highest gain, and a model adjustment arrangement to adjust the model using the selected feature.

Yet another exemplary embodiment of the present invention is directed to a processing arrangement system to perform maximum entropy modeling in which feature ranking arrangement is configured to re-use gains of remaining candidate features determined in a previous feature selection stage using a previously adjusted model.

Still another exemplary embodiment of the present invention is directed to a processing arrangement system to perform maximum entropy modeling in which the gain computation arrangement is configured to determine gains for top-ranked features in descending order from a highest to lowest until a top-ranked feature is encountered whose corresponding gain based on a current model is greater than gains of the remaining candidate features.

Yet another exemplary embodiment of the present invention is directed to a processing arrangement system to perform maximum entropy modeling in which the gain computation arrangement is configured to determine gains for a predefined number of top-ranked features at each feature selection stage.

Still another exemplary embodiment of the present invention is directed to a processing arrangement system to perform maximum entropy modeling in which the predefined number of top-ranked features is 500.

Still another exemplary embodiment of the present invention is directed to a processing arrangement system to perform maximum entropy modeling in which gains of all candidate features remaining at a predefined feature selection stage are re-evaluated.

Yet another exemplary embodiment of the present invention is directed to a storage medium having a set of instructions executable by a processor to order candidate features based on gains computed on a uniform distribution to form an ordered list of candidate features, select a top-ranked feature with a largest gain to form a model for a next stage, remove the top-ranked feature from the ordered list of the candidate features, compute a gain of the top-ranked feature based on a model formed in a previous stage, compare the gain of the top-ranked feature with gains of remaining candidate features in the ordered list, include the top-ranked feature in the model if the gain of the top-ranked feature is greater than the gain of a next-ranked feature in the ordered list, if the gain of the top-ranked feature is less than any of the gains of the next-ranked feature in the ordered list insert the top-ranked feature in the ordered list so that the next-ranked feature becomes the top-ranked feature and an order of the ordered list is maintained and repeat the steps of computing the gain of the top-ranked feature, comparing the gains of the top-ranked and next-ranked features until the gain of the top-ranked feature exceeds the gains of ordered candidate features, and terminate the method if one of a quantity of selected features reaches a pre-defined value and a gain of a last feature reaches a pre-defined value.

BRIEF DESCRIPTION OF THE DRAWINGS

FIG. 2 shows pseudo code reflecting an exemplary incremental feature selection (IFS) approach.

FIG. 3 shows pseudo code reflecting an exemplary selective gain computation (SGC) method for feature selection.

DETAILED DESCRIPTION

Figure 1:
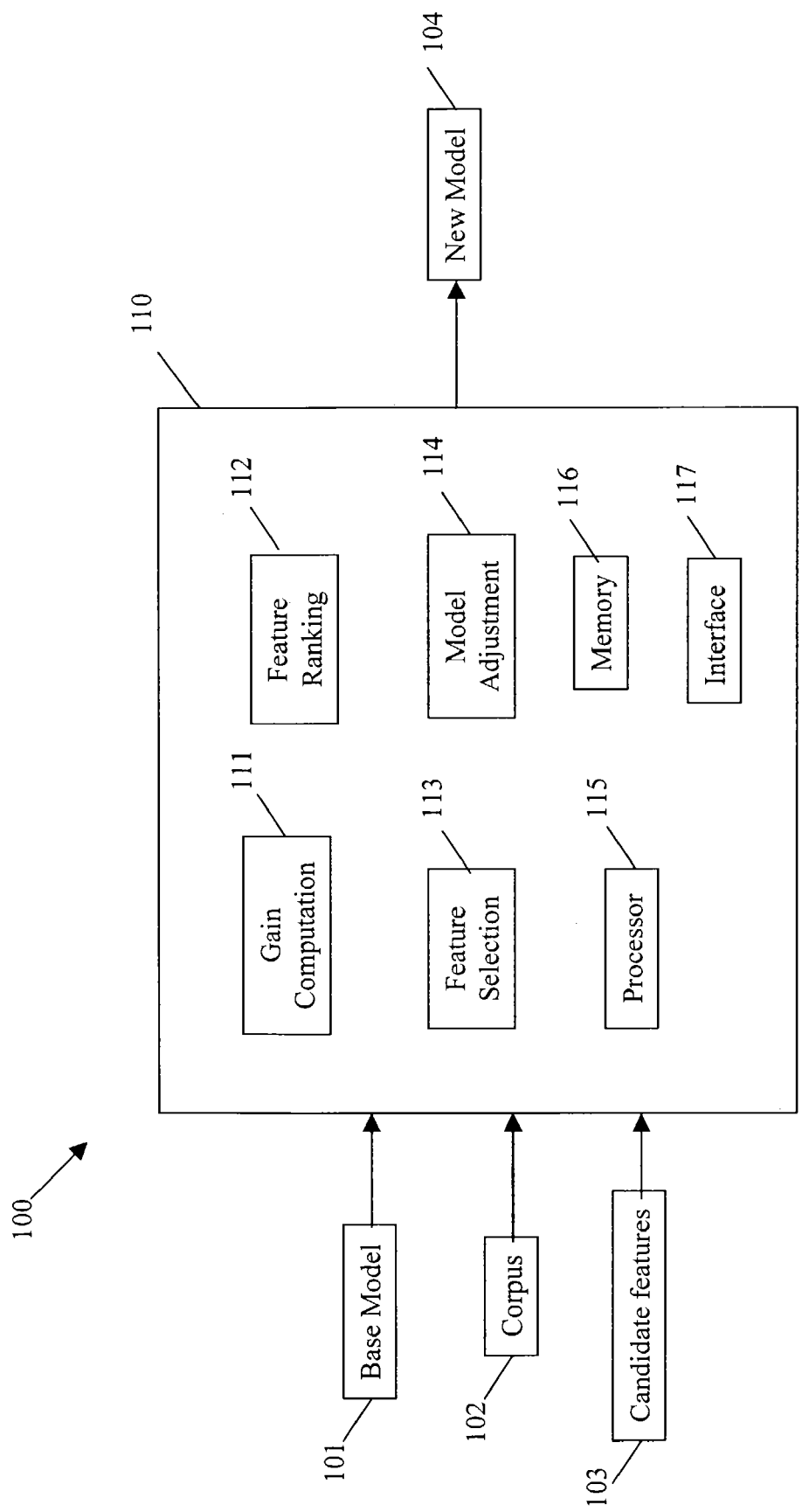
FIG. 1 shows an exemplary maximum entropy modeling system that uses a selective gain computation (SGC) method to perform feature selection.

FIG. 1 shows an exemplary entropy modeling system 100 that uses a selective gain computation (SGC) method to perform feature selection, in which one or more candidate features 103 derived from a corpus of data 102 are incorporated 110 into a base model 101 by a processing arrangement 110 to produce a new model 104 for predicting linguistic behavior. The corpus of data 102 may include, for example, the financial newspaper text of the Wall Street Journal from the Penn Treebank prepared by the Linguistic Data Consortium, and the base model 101 may be, for example, a uniform distribution.

The exemplary processing arrangement 110 includes a gain computation arrangement 111 to determine or compute the gains of all the candidate features 103 during the initialization stage and the gains for only the top-ranked features during each feature selection stage, a feature ranking arrangement 112 to rank features in an ordered list, a feature selection arrangement 113 to select a feature which has the highest gain in the ordered list, a model adjustment arrangement 114 to adjust the model using the selected feature, a processor 115 to perform methods and calculations described herein, a memory 116 to store data, and an interface 117 or other suitable graphical interface (GUI) for interacting with the exemplary entropy modeling system 100.

FIG. 2 shows exemplary pseudo code that reflects an incremental feature selection (IFS) approach to selecting features, where S represents the set of selected features, I represents the number of training instances, Y represents the number of output classes, and F represents the number of candidate features or the size of the candidate feature set. The exemplary IFS pseudo code may be described as follows. Suppose the conditional ME model takes the following form:

$$p(y \mid x) = \frac{1}{Z(x)} = \exp\left(\sum_j \lambda_j f_j(x, y)\right),$$

where $f_j(x,y)$ is a feature function (or feature for short) that describes a certain linguistic event $(x,y)$, $\lambda_j$ is a corresponding weight indicating how important feature $f_j$ is for the model, $Z(x)$ is a normalization factor, and $p(y|x)$ is the resulting conditional probability distribution that maximizes the entropy—that is, the probability that the model assigns output y in the presence of contextual information x.

The exemplary implementation reflecting the IFS approach may make an approximation by assuming that the addition of a feature f in an exponential model affects only its associated weight $\alpha$, leaving unchanged the $\lambda$-values associated with the other features. In this regard, the exemplary IFS pseudo code of FIG. 2 reflects a technique referred to in Joshua Goodman, "Sequential Conditional Generalized Iterative Scaling", Association for Computational Linguistics, Philadelphia, Pa., 2002 ("Goodman (2002)") to optimize the parameters in the conditional ME training. More specifically, an array z is used to store the normalizing factors, and an array sum is used for all the un-normalized conditional probabilities sum[i, y]. Thus, one may only need to modify those sum[i, y] that satisfy $f^*(x_i, y)=1$, and to make changes to their corresponding normalizing factors z[i]. The different values in this exemplary IFS pseudo code may be computed or determined as follows.

Let us denote the following:

$$\text{sum}(y \mid x) = \exp\left(\sum_j \lambda_j f_j(x, y)\right)$$

$$Z(x) = \sum_y \text{sum}(y \mid x)$$

Then, the model maybe represented by sum(y|x) and Z(x) as follows:

$$p(y|x) = \text{sum}(y|x)/Z(x),$$

where $\text{sum}(y|x_i)$ and $Z(x_i)$ correspond to sum[i,y] and z[i] in FIG. 1, respectively.

Assuming the selected feature set is S, and feature f is currently being considered, an attempt is made at each selection stage to select the feature f that maximizes the gain of the log likelihood, where the weighting factor $\alpha$ and gain of f are derived through following steps:

Let the log likelihood of the model be:

$$L(p) \equiv -\sum_{x,y} \tilde{p}(x, y)\log(p(y \mid x))$$

$$= -\sum_{x,y} \tilde{p}(x, y)\log(\text{sum}(y \mid x)/Z(x))$$

and the empirical expectation of feature f be:

$$E_{\tilde{p}}(f) = \sum_{x,y} \tilde{p}(x, y) f(x, y).$$

Using an approximation assumption referred to in Berger et al. (1996), the un-normalized component and the normalization factor of the model may have the following recursive forms:

$$\text{sum}^\alpha_{S \smile f}(y \mid x) = \text{sum}_S(y \mid x) \cdot e^\alpha,$$

$$Z^\alpha_{S \smile f}(x) = Z_S(x) - \text{sum}_S(y \mid x) + \text{sum}^\alpha_{S \smile f}(y \mid x)$$

The approximate gain of the log likelihood is computed or determined as follows $$G_{S \smile f}(\alpha) \equiv L(p^\alpha_{S \smile f}) - L(p_S)$$

$$= -\sum_x \tilde{p}(x)(\log Z_{S \smile f, \alpha}(x) / Z_S(x)) + \alpha E_{\tilde{p}}(f)$$

The maximum approximate gain and its corresponding $\alpha$ are represented as:

$$\sim \Delta L(S, f) = \max_\alpha G_{S \smile f}(\alpha)$$

$$\sim \alpha(S, f) = \arg\max_\alpha G_{S \smile f}(\alpha)$$

The above exemplary implementation reflecting the IFS approach may be inefficient because all the candidate features are considered before one is selected, and the gains for every feature are re-computed or re-determined at each selection stage. In addition, to compute a parameter using an iterative root-finding technique, such as, for example, Newton's method, may not be efficient. Therefore, the total computation for the whole selection processing may be undesirably expensive.

FIG. 3 shows pseudo code for an exemplary selective gain computation (SGC) method for ME modeling that may provide faster feature selection as compared to the exemplary pseudo code implementation of FIG. 2 reflecting the IFS approach. The exemplary SGC feature selection method may be explained as follows.

Let g(j, k) represent the gain due to the addition of feature $f_j$ to the active model at selection stage k. In experiments, it may be found even if $\Delta$ (i.e., the additional number of stages after stage k) is large, for most j, $g(j, k+\Delta)-g(j, k)$ is a negative number or at most a very small positive number. Accordingly, the g(j, k) may be used to approximate the upper bound of g(j, k+$\Delta$).

In this regard, when a new feature is added to a model, the gains for the other features before the addition and after the addition may not change much. When there are changes, their actual amounts should essentially be within a narrow range across different features from top-ranked ones to the bottom-ranked ones. Therefore, the gains may only be required to be computed and compared from the top-ranked feature downward until we reach the feature whose corresponding gain, based on the new model, that is larger than the gains of the remaining features. With a few exceptions, the gains of the majority of the remaining features may be reused based on the previous models.

As with the exemplary pseudo code implementation of FIG. 2 reflecting an IFS approach, it may be assumed that the addition of a feature f only affects its weighting factor $\alpha$.

Because a uniform distribution is assumed as the prior in the initial stage, a closed-form formula for α(j, 0) and g(j, 0) may be derived as follows.

Let
$$E_\delta(f) = \sum_x \tilde{p}(x)\max_y\{f(x, y)\}$$
$$R_e(f) = E_{\tilde{p}}(f)/E_\delta(f)$$
$$p_0 = 1/Y$$
then
$$\alpha(j, 0) = \log\left(\frac{R_e(f)}{p_0} \cdot \frac{1 - p_0}{1 - R_e(f)}\right)$$
$$g(j, 0) = L(p_{\varnothing \smile f}^{\alpha(i,0)}) - L(p_\varnothing)$$
$$= E_\delta(f)\left[R_e(f)\log\frac{R_e(f)}{p_0} + (1 - R_e(f))\log\frac{1 - R_e(f)}{1 - p_0}\right]$$

where ∅ denotes an empty set and $p_\varnothing$ is the uniform distribution. The other steps for computing or determing the gains and selecting the features are provided in FIG. 3 as pseudo code. Because only the gains for a small number of top-ranked features are computed, this feature selection method is referred to as the selective gain computation (SGC) method.

In the exemplary SGC feature selection method, an array g is used to keep the sorted gains and their corresponding feature indices. In practice, a binary search tree may be used to maintain the order of the array.

Unlike the exemplary pseudo code implementation of FIG. 2 reflecting the IFS approach, the exemplary SGC feature selection method of FIG. 3 does not evaluate all the features for the active model at every stage (one stage corresponds to the selection of a single feature). Initially, the feature candidates are ordered based on their gains computed via the uniform distribution. The feature with the largest gain is selected and forms the model for the next stage. In the next stage, the gain of the top feature in the ordered list is computed based on the model just formed in the previous stage. This gain is compared with the gains of the rest features in the list. If this newly computed gain is still the largest, this feature is added to form the model at the next stage. If the gain is not the largest, it is inserted in the ordered list so that the order is maintained. In this case, the gain of the next top-ranked feature in the ordered list is re-computed using the model at the current stage.

This process may continue until the gain of the top-ranked feature computed under the current model is still the largest gain in the ordered list. Then, the model for the next stage is created with the addition of this newly selected feature. The entire feature selection process stops either when the number of the selected features reaches a pre-defined value in the input, or when the gains become too small to be useful to the model In addition to this first exemplary embodiment of the SGC feature selection method, at each stage, additional gains may be re-computed based on the current model for a pre-defined number of features listed right after features f* (obtained in step 2) in the ordered list to ensure that the selected feature f* is indeed the feature with the highest gain within the pre-defined look-ahead distance. This exemplary embodiment may be referred to as the look-ahead version of the SGC feature selection method.

Figure 4:
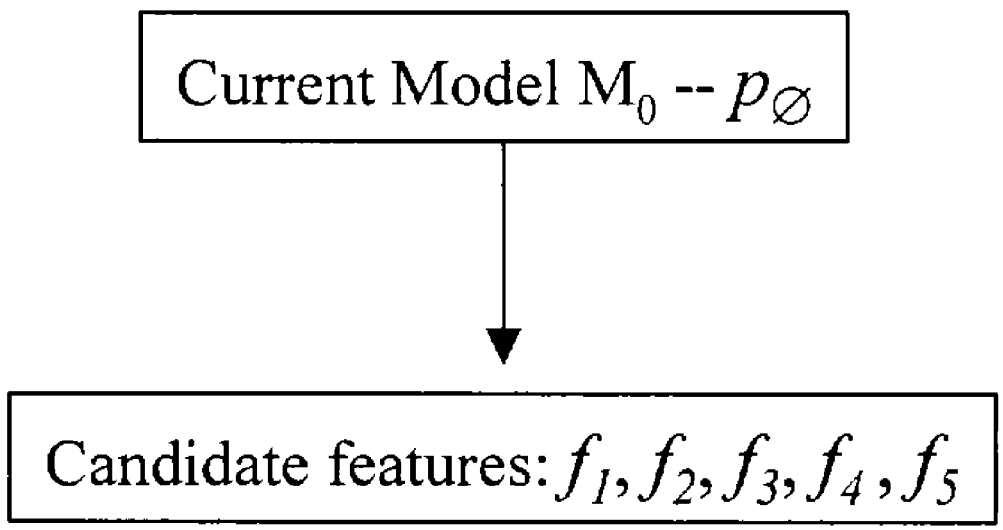
FIG. 4 shows exemplary initialization steps according to either the IFS approach or the SGC method.
Figures 5A, 5B:
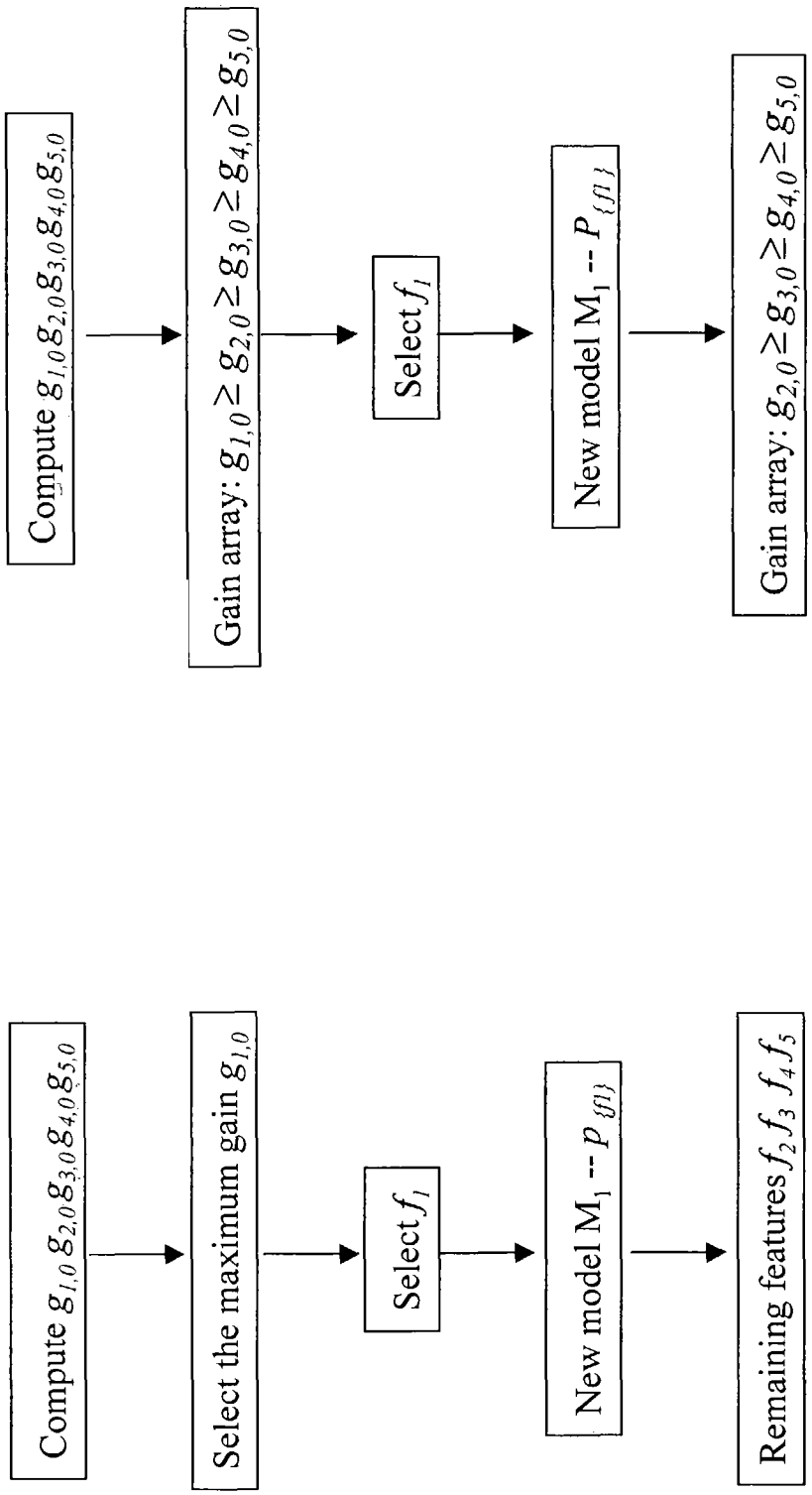
FIG. 5A shows exemplary IFS steps for feature selection stage k=0.
FIG. 5B shows exemplary SGC steps for feature selection stage k=0.
Figures 6A, 6B:
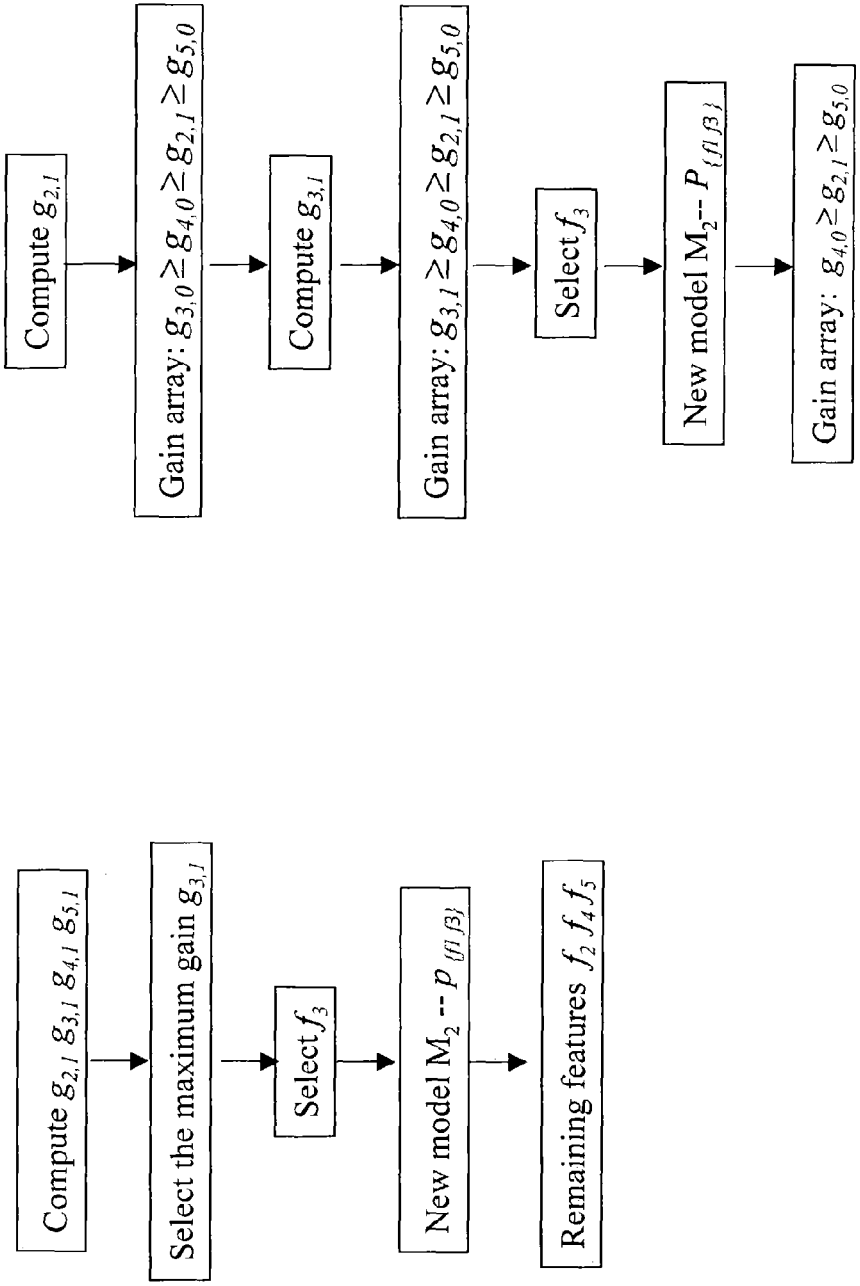
FIG. 6A shows exemplary IFS steps for feature selection stage k=1.
FIG. 6B shows exemplary SGC steps for feature selection stage k=1.
Figure 7B:
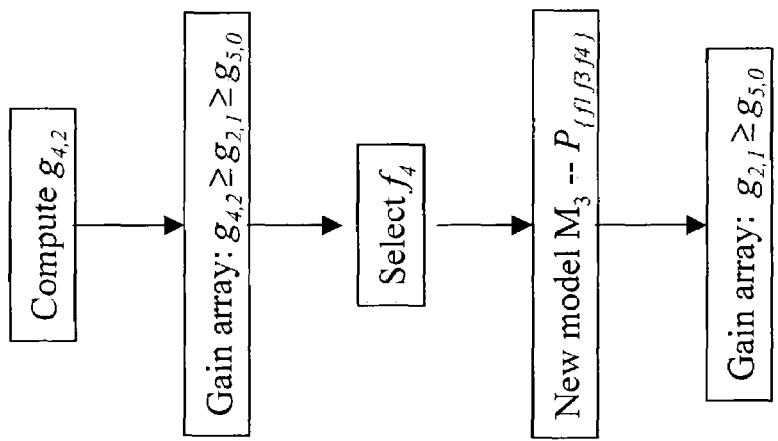
FIG. 7B shows exemplary SGC steps for feature selection stage k=2.
Figure 7A:
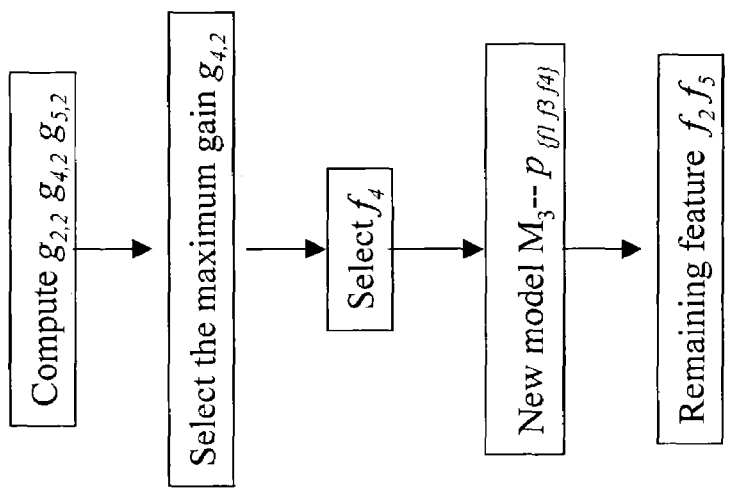
FIG. 7A shows exemplary IFS steps for feature selection stage k=2.

FIGS. 4 through 7 provide a "step-by-step" comparison of the IFS and SGC feature selection methods from initialization through stages k=0, 1 and 2 of feature selection for an exemplary feature event space of five candidate features $f_1$, $f_2$, $f_3$, $f_4$, $f_5$, where $g_{j,k}$ represent the gain of feature $f_j$ at stage k, $M_k$ represents the model resulting from addition of the feature having maximum gain at stage k, and $p_\varnothing$ represents a uniform distribution. In particular, FIG. 4 shows exemplary initialization steps according to either the IFS approach or the SGC method, FIGS. 5A, 6A and 7A show exemplary IFS steps at selection stages k=0, 1 and 2 respectively, and FIGS. 5B, 6B and 7B show exemplary SGC steps at a selection stages k=0, 1 and 2 respectfully.

Figure 8:
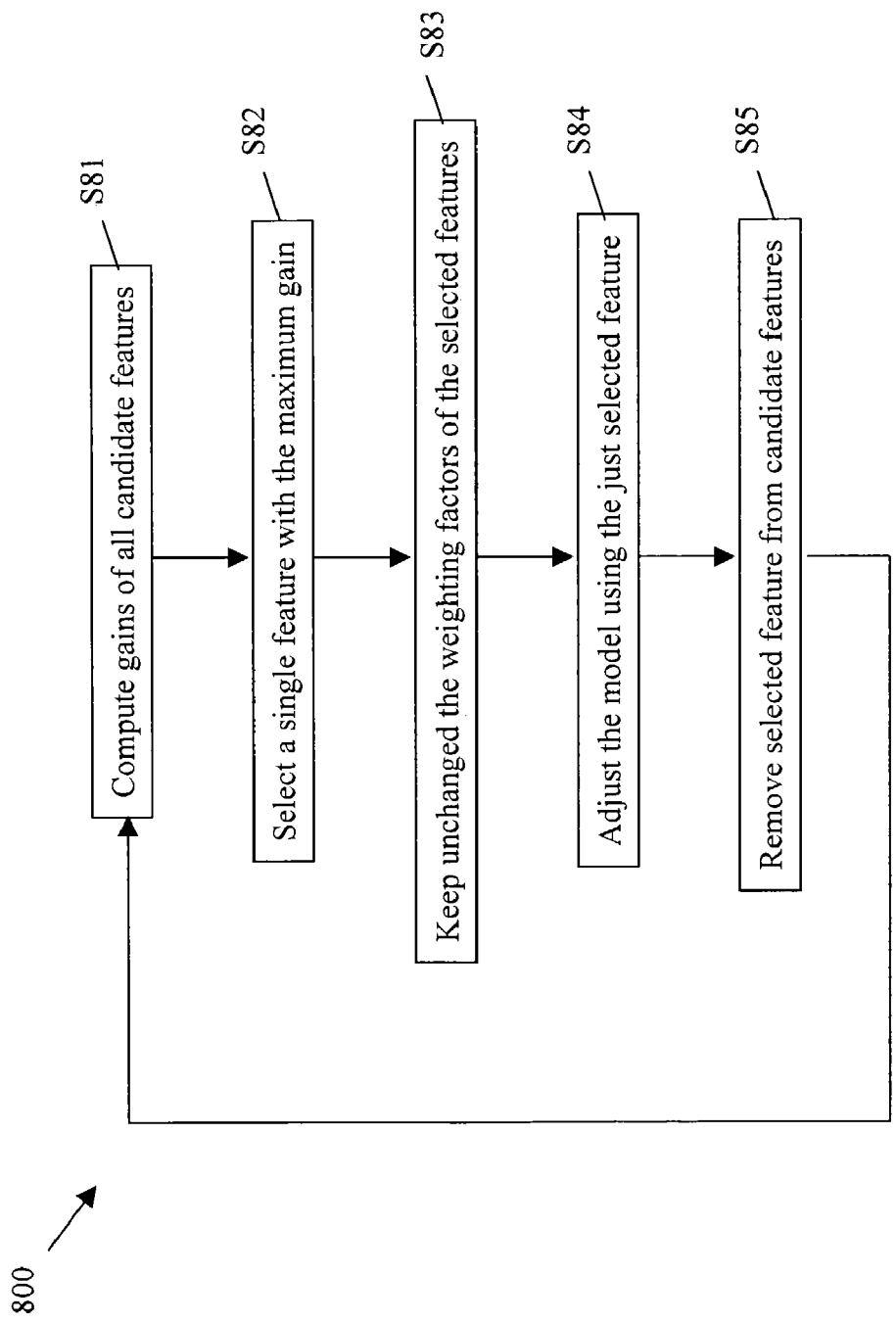
FIG. 8 shows a flow chart 800 describing the exemplary feature selection steps for the incremental feature selection (IFS) approach shown in FIGS. 4, 5A, 6A, and 7A.

FIG. 8 shows an exemplary flow chart 800 of feature selection steps for the incremental feature selection (IFS) approach shown in FIGS. 4, 5A, 6A and 7A. In step S81, the gains of all candidate features are computed. In step S82, a single feature having the maximum gain is selected. In step S83, the weighting factors of the just selected feature and all previously selected features is kept unchanged. In step S84, the model is adjusted using the just selected feature. In step S85, the selected feature is removed from the list of candidate features.

Figure 9:
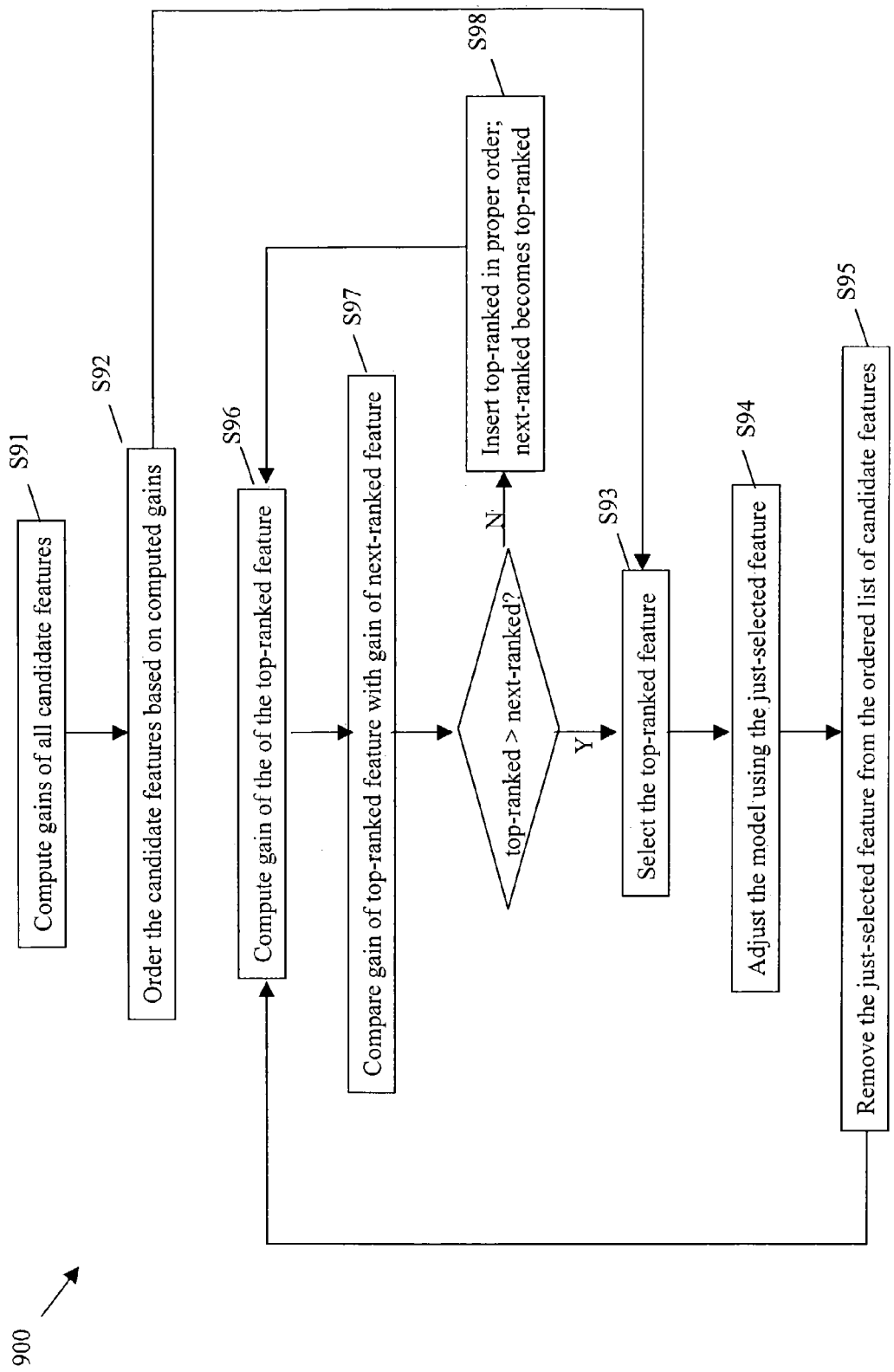
FIG. 9 shows a flow chart 900 describing the exemplary feature selection steps for the selective gain computation (SGC) method shown in FIGS. 4, 5B, 6B, and 7B.

FIG. 9 shows an exemplary flow chart 900, which may used in the exemplary processing arrangement and system of FIG. 1, describing the feature selection steps for the selective gain computation (SGC) method shown in FIGS. 4, 5B, 6B, and 7B. In step S91, the system computes gains of all candidate features. In step S92, the system orders candidate features based on the their corresponding computed gains, where, for example, the feature with the highest gain is ranked first and the feature with the lowest gain is ranked last. The ordered list may be stored, for example, in an array referred to, for example, as the gain array. In step S93, the system selects the top-ranked feature with the highest gain. In step S94, the system adjusts the model using the just-selected feature. In step S95, the system removes the selected feature from the ordered list of candidate features. In step S96, the system computes the gain of the top-ranked feature of the ordered list of candidate features. In step S97, the system compares the gain of the top-ranked feature with the gain of the next-ranked feature in the ordered list of candidate features. If the gain of the top-ranked feature gain is greater than the gain of next-ranked feature, then the SGC method proceeds to step S93 in the system, otherwise, if the gain of the top-ranked feature is less than the gain of the next-ranked feature, the SGC method proceeds to step S98 in the system, in which the top-ranked feature is repositioned in the ordered list so that the next-ranked feature becomes the new top-ranked feature and the proper order of the list is maintained—that is, the former top-ranked feature is moved from the highest position in the ordered list to the proper-ranked position based on the recently computed gain. Thereafter, the SGC method proceeds back to step S96 to compute the gain of the newly-ranked top feature in the order list of candidate features.

Experiments were conducted to compare the performance of the IFS approach and the SGC feature selection method of the present invention.

The first sets of experiments use a dataset {(x, y)}, derived from the Penn Treebank prepared by the Linguistic Data Consortium, where x is a 10 dimension vector including word, part-of-speech (POS) tag and grammatical relation tag information from two adjacent regions, and y is the grammatical relation tag between the two regions. Examples of the grammatical relation tags include subject and object with either the right region or the left region as the head. The total number of different grammatical tags, i.e., the size of the output space, is 86. A little more than 600,000 training instances were generated from a corpus of Wall Street Journal financial newspaper text obtained from section $O_2$-22 of the Penn Treebank, and the test corpus was generated from section 23.

In the experiments, the feature event space is partitioned into sub-spaces, called feature templates, where only certain dimensions are included. To consider all the possible combinations in the 10-dimensional space would require $2^{10}$ feature templates. To perform the comparison, linguistic knowledge was used to filter out implausible subspaces so that only 24 feature templates were actually used. With this amount of feature templates, more than 1,900,000 candidate features may be obtained from the training data. To speed up the experiments, which may be required for the exemplary pseudo code implementation reflecting the IFS approach, a cutoff of 5 may be used to reduce the feature space down to 191,098 features. On average, each candidate feature covers about 485 instances, which accounts for 0.083% over the whole training instance set and is computed as follows:

$$ac = \sum_j \sum_{x,y} f_j(x, y) \bigg/ \sum_j 1$$

The first experiment compared the speed of the exemplary pseudo code implementation reflecting the IFS approach with that of the exemplary SGC feature selection method. Assuming the exemplary pseudo code implementing the IFS approach computes the gains for all the features at every stage, the exemplary implementation reflecting the IFS approach requires O(NF) time to select a feature subset of size N from a candidate feature set of size F. By comparison, the exemplary SGC feature selection method may consider much fewer features (for example, only 24.1 features on average at each stage) when selecting a feature from the large feature space in this experiment.

Figure 10:
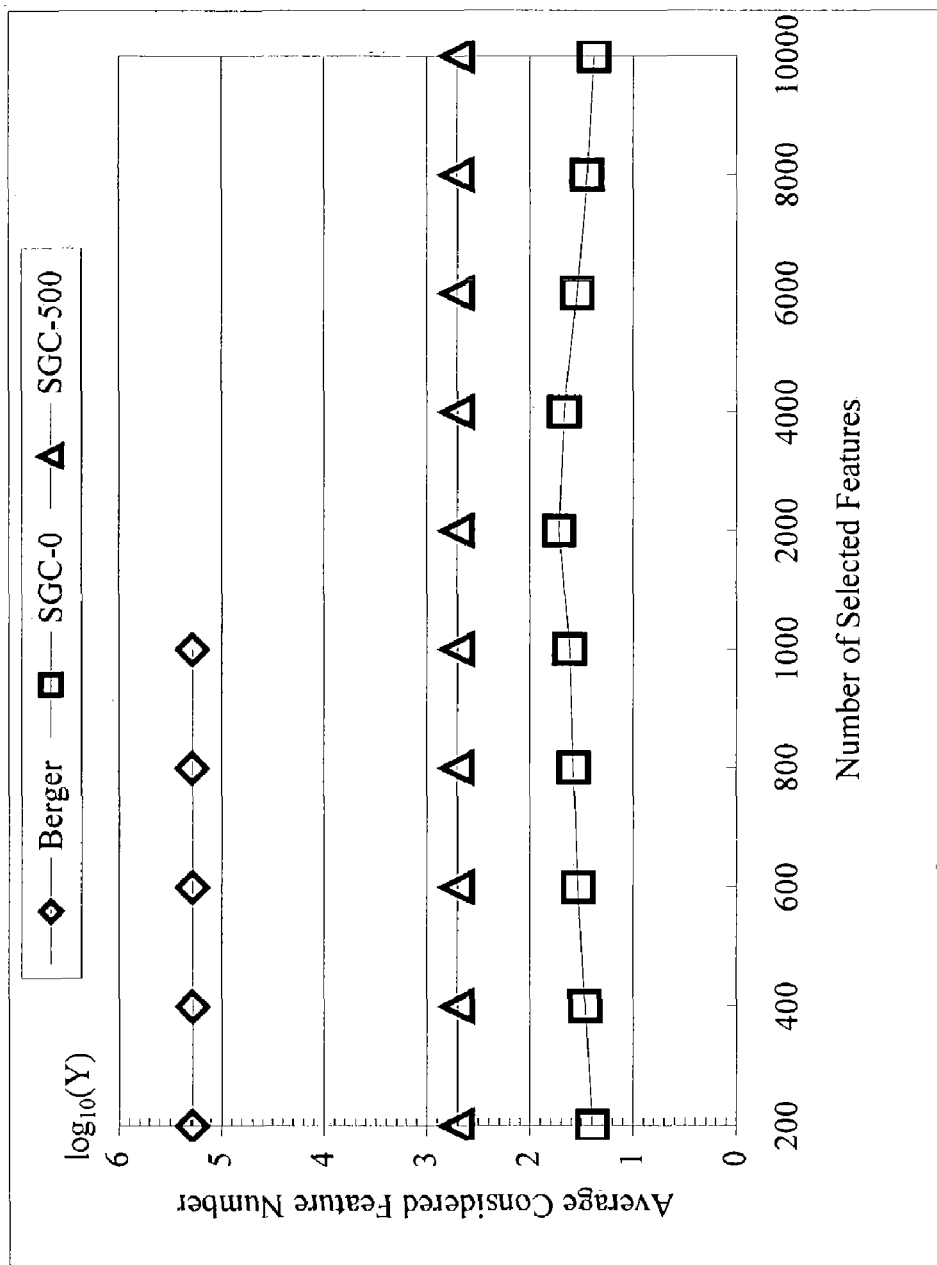
FIG. 10 shows experimental or empirical results to compare the number features considered by the exemplary implementation reflecting the IFS approach and the exemplary SGC and SGC-with-look-ahead feature selection methods.

FIG. 10 shows the average number of features for which gains are computed for the exemplary SGC feature selection method, the exemplary SGC feature selection method with "500" look-ahead, and the exemplary pseudo code implementation reflecting the IFS approach. The averaged number of features is taken over an interval from the initial stage to the current feature selection point, which is intended to smooth out the fluctuation of the numbers of features each selection stage considers. The exemplary SGC feature selection method with "500" look-ahead looks at an additional fixed number of features, 500 in this experiment, beyond the ones considered by the exemplary SGC feature selection method without the look-ahead functionality. The exemplary SCG feature selection method with "500" look-ahead has a linear decreasing number of features to select because the selected features will not be considered again. In FIG. 10, the exemplary pseudo code implementation reflecting the IFS approach stops after 1000 features are selected because it takes too long for this algorithm to complete the entire selection process. The same stoppage occurs in FIG. 11, which is explained below. The exemplary SGC feature selection method with "500" look-ahead computes gains for fewer features on average than the exemplary pseudo code implementation reflecting the IFS approach. The SGC feature selection method without the "500" look-ahead functionality computes fewer still.

Figure 11:
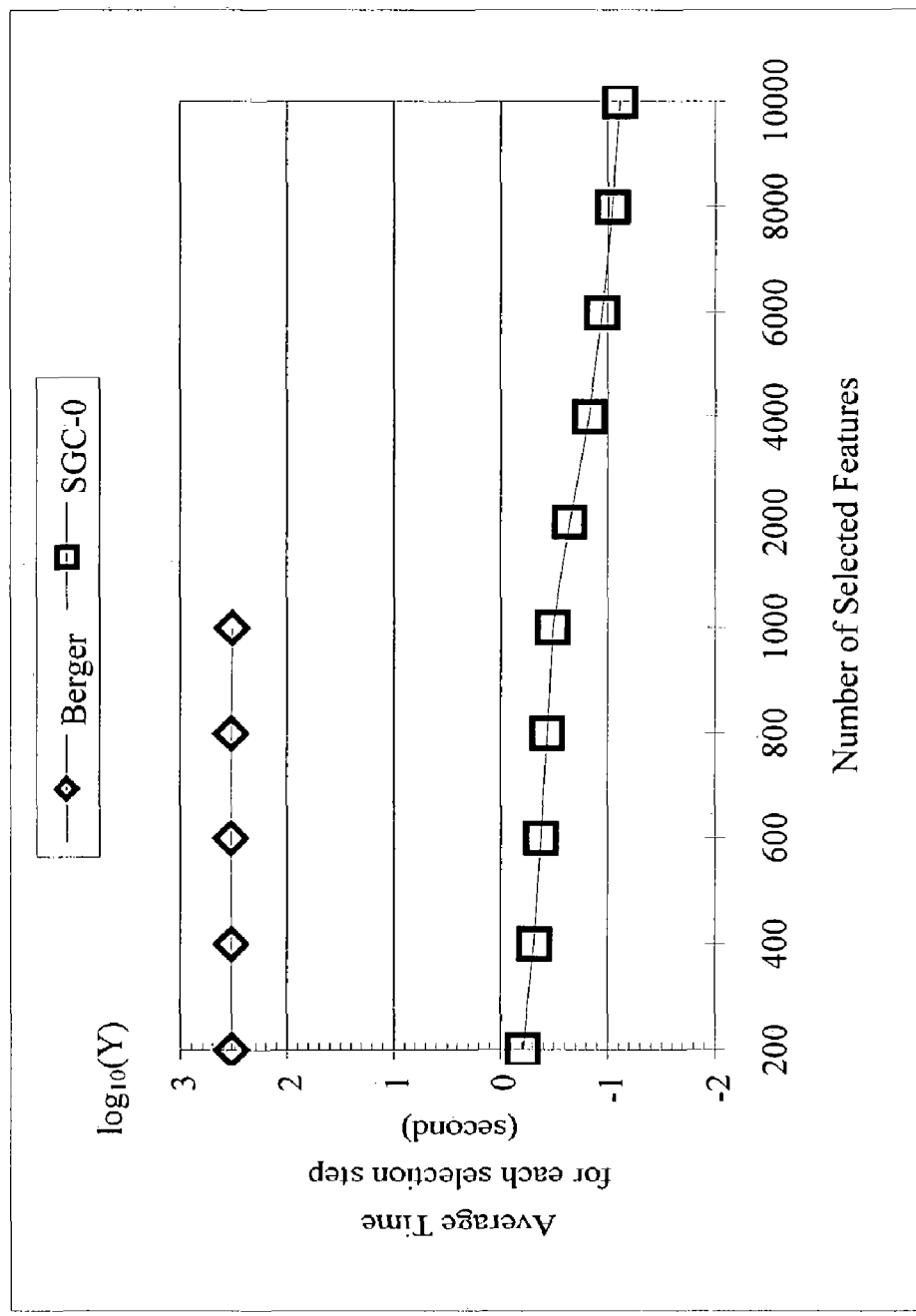
FIG. 11 shows experimental or empirical results to compare the amount of processing time used by the exemplary implementation reflecting the IFS approach and the exemplary SGC feature selection method.

FIG. 11 compares the amount of time required by the exemplary SGC feature selection methods and the exemplary pseudo code implementation reflecting the IFS approach. A Linux workstation was used with 1.6 Ghz dual Xeon CPUs and 1 GB (gigabyte) memory to run the two experiments simultaneously. Excluding the beginning part of the code that is commonly shared, the speedup from using the exemplary SGC feature selection method is many orders of magnitude faster than the exemplary implementation reflection the IFS approach, ranging from more than 100 times to thousands, depending on the number of features selected.

To verify the quality of the selected features using the exemplary SGC feature selection method four experiments were conducted. In the first experiment, all the features were used to build a conditional ME model. In the second experiment, the exemplary pseudo code implementation reflecting the IFS approach was used to select 1,000 features. In the third experiment, the exemplary SGC feature selection method was used. In the fourth experiment, the exemplary SGC feature selection method with "500" look-ahead was used. In the fifth experiment, the top "n" most frequent features were obtained from the training data. The precision percentages were computed on section 23 of the Wall Street Journal data set in the Penn Treebank. The results are listed in FIG. 12.

Figure 12:
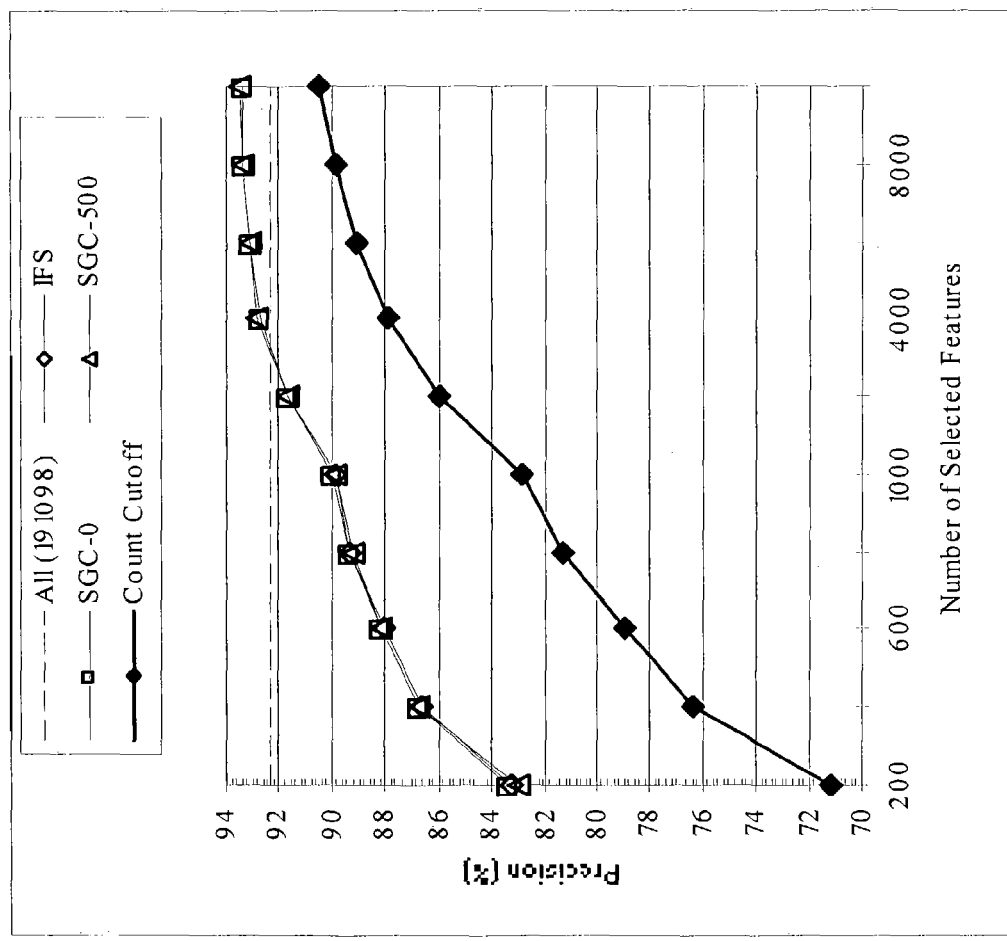
FIG. 12 shows experimental or empirical results to compare the selection precision of the exemplary implementation reflecting the IFS approach, the exemplary SGC feature selection method, the exemplary SGC feature selection method with-look-ahead, and the simple count cutoff algorithm.

As may be evident from FIG. 12, when the models include more than 3000 selected features the performance of the SGC feature selection methods significantly surpass the model with all the features. The inferior performance of the model with all the features at the right side of the chart may be due to the data over-fitting problem. Furthermore, the simple count cutoff algorithm under-performs the other feature selection algorithms when feature subsets with no more than 10,000 features are considered.

To further confirm the findings regarding precision, another experiment was conducted with Base NP recognition as the task. The experiment uses section 15-18 of Wall Street Journal text as the training data, and section 20 as the test data. During the experiment 1,160 features were selected from a simple feature space using the SGC feature selection method to obtain a precision/recall of 92.75%/93.25%. It is understood that the best reported ME work on this task includes Koeling (2000) that has the precision/recall of 92.84%/93.18% with a cutoff of 5, and Zhou Ya-qian, Guo Yi-kun, Huang Xuan-jing, and Wu Li-de, "Chinese and English BaseNP Recognized by Maximum Entropy", Journal of Computer Research and Development. 40(3):440-446, Beijing, 2003 ("Zhou et al. (2003)") has reached the performance of 93.04%/93.31% with cutoff of 7 and reached a performance of 92.46%/92.74% with 615 features using the pseudo code implementation reflecting the IFS approach. While the results may not be directly comparable due to different feature event spaces used in the above experiments, the results may be considered competitive to these best numbers indicating that the SGC feature selection method may be both effective in selecting high quality features and efficient in performing the task.

What is claimed is:
1. A computer implemented method to select features for maximum entropy modeling for language and statistical processing, the method comprising:
 (a) determining gains of log likelihood for candidate features during an initialization stage;
 (b) ranking the candidate features in an ordered list based on the determined gains;

(c) selecting a top-ranked feature in the ordered list with a highest gain;
(d) adjusting a maximum entropy model using the selected top-ranked feature;
(e) determining gains of log likelihood for only a first predefined number of top-ranked features;
(f) repeating steps (b) through (e) until a number of selected features equals a second predefined number;
(g) storing the second predefined number of selected top-ranked features and the adjusted model in a file.

2. The method of claim 1, wherein the gains of the candidate features determined in a previous feature selection stage are reused as upper bound gains of remaining candidate features in a current feature selection stage.

3. The method of claim 2, wherein the top-ranked feature is selected if its determined gain is greater than the upper bound gains of the remaining candidate features.

4. The method of claim 1, wherein the top-ranked feature is selected when a gain of the top-ranked feature determined using a currently adjusted model is greater than the gains of remaining candidate features determined using a previously adjusted model.

5. The method of claim 1, wherein gains for a predefined number of top-ranked features are determined at each feature selection stage.

6. The method of claim 1, further comprising:
re-evaluating gains of all remaining candidate features at a predefined feature selection stage.

7. The method of claim 1, wherein only the un-normalized conditional probabilities that satisfy a set of selected features are modified.

8. The method of claim 7, wherein gains of a majority of the candidate features remaining at each feature selection stage are reused based on a model adjusted in a previous feature selection stage.

9. A computer implemented method to select features for maximum entropy modeling for language and statistical processing, the method comprising:
(a) computing gains of log likelihood of candidate features using a uniform distribution;
(b) ordering the candidate features in an ordered list based on the computed gains;
(c) selecting a top-ranked feature with a highest gain in the ordered list;
(d) adjusting a maximum entropy model using the selected top-ranked feature;
(e) removing the top-ranked feature from the ordered list so that a next-ranked feature in the ordered list becomes the top-ranked feature and marking all features as not ranked;
(f) computing a gain of the top-ranked feature using the adjusted model;
(g) comparing the gain of the top-ranked feature with a gain of the next-ranked feature in the ordered list;
(h) if the gain of the top-ranked feature equals or is more than the gain of the next-ranked feature marking it as ranked and selecting the next-ranked feature that is not marked as ranked as the top-ranked feature;
(i) if the gain of the top-ranked feature is less than the gain of the next-ranked feature, repositioning the top-ranked feature in the ordered list so that the next-ranked feature becomes the top-ranked feature;
(j) repeating steps (f) through (i) until number of top-ranked features that are marked ranked equals a first predefined number;

(k) repeating steps (c) through (j) until one of a number of selected features equals a second predefined number and a gain of a last-selected feature falls below a predefined value; and
(l) storing the second predefined number of selected top-ranked features and the adjusted model in a file.

10. The method of claim 9, wherein the gains of all remaining candidate features at a predefined feature selection stage are re-evaluated.

11. A processing system to perform maximum entropy modeling in which one or more candidate features derived from a corpus of data are incorporated into a maximum entropy model that predicts linguistic behavior, the system comprising:
a computer with at least one processor, a memory storing a program of instructions and a display device;
a gain computation logic to determine gains of log likelihood for the candidate features during an initialization stage and to determine gains for only a first predefined number of top-ranked features during a feature selection stage;
a feature ranking logic to rank features based on the determined gains;
a feature selection logic to select a feature with a highest gain as a top-ranked feature; and
a model adjustment logic to adjust the maximum entropy model using the selected top-ranked feature;
wherein when the program is executed on the processor, a second predefined number of features with the highest gains are selected as the top-ranked features and included in the maximum entropy model; and
the second predefined number of selected top-ranked features and the adjusted model are stored in a file.

12. The processing system of claim 11, wherein feature ranking logic is configured to re-use gains of remaining candidate features determined in a previous feature selection stage using a previously adjusted model.

13. The processing system of claim 11, wherein the gain computation logic is configured to determine gains for top-ranked features in descending order from a highest to lowest until a top-ranked feature is encountered whose corresponding gain based on a current model is greater than gains of the remaining candidate features.

14. The processing system of claim 11, wherein the gain computation logic is configured to determine gains for a predefined number of top-ranked features at each feature selection stage.

15. The processing system of claim 14, wherein the predefined number of top-ranked features is 500.

16. The processing system of claim 11, wherein gains of all candidate features remaining at a predefined feature selection stage are re-evaluated.

17. A computer storage medium having a set of instructions executable by a processor to perform maximum entropy modeling in which one or more candidate features derived from a corpus of data are incorporated into a maximum entropy model that predicts linguistic behavior comprising instructions for:
(a) ordering candidate features based on gains of log likelihood computed using a uniform distribution to form an ordered list of candidate features;
(b) selecting a top-ranked feature with a largest gain and adjusting the maximum entropy model for a next stage;
(c) removing the top-ranked feature from the ordered list of the candidate features so that a next-ranked feature in the ordered list becomes the top-ranked feature and marking all features as not ranked;

(d) computing a gain of the top-ranked feature using the adjusted model;
(e) comparing the gain of the top-ranked feature with a gain of the next-ranked feature in the ordered list;
(f) if the gain of the top-ranked feature equals or is more than the gain of the next-ranked feature marking it as ranked and selecting the next-ranked feature that is not marked as ranked as the top-ranked feature;
(g) if the gain of the top-ranked feature is less than the gain of the next-ranked feature, repositioning the top-ranked feature in the ordered list so that the next-ranked feature becomes the top-ranked feature;
(h) repeating steps (d) through (g) until number of top-ranked features that are marked ranked equals a first predefined number;
(i) repeating steps (b) through (h) until one of a number of selected features reaches a second predefined number and a gain of a last-selected feature falls below a predefined value; and
(j) storing the second predefined number of selected top-ranked features and the model in a file.

* * * * *